United States Patent
Ueda et al.

(10) Patent No.: US 7,155,892 B2
(45) Date of Patent: *Jan. 2, 2007

(54) MATERIAL FOR GLAND PACKING AND THE GLAND PACKING

(75) Inventors: Takahisa Ueda, Osaka (JP); Masaru Fujiwara, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/527,624

(22) PCT Filed: Sep. 9, 2003

(86) PCT No.: PCT/JP03/11503

§ 371 (c)(1),
(2), (4) Date: Mar. 10, 2005

(87) PCT Pub. No.: WO2004/025150

PCT Pub. Date: Mar. 25, 2004

(65) Prior Publication Data

US 2006/0010849 A1 Jan. 19, 2006

(30) Foreign Application Priority Data

Sep. 11, 2002 (JP) ............................. 2002-265984
Sep. 11, 2002 (JP) ............................. 2002-265985
Sep. 11, 2002 (JP) ............................. 2002-265986
Sep. 11, 2002 (JP) ............................. 2002-265987

(51) Int. Cl.
*D02G 3/02* (2006.01)

(52) U.S. Cl. .......................................... 57/235; 57/260
(58) Field of Classification Search .................. 57/210, 57/212, 229, 236, 260
See application file for complete search history.

(56) References Cited

U.S. PATENT DOCUMENTS

| | | | |
|---|---|---|---|
| 5,549,306 A * | 8/1996 | Ueda ........................... 277/537 |
| 6,502,382 B1 * | 1/2003 | Fujiwara et al. ............... 57/200 |
| 6,708,479 B1 * | 3/2004 | Fujiwara et al. ............... 57/200 |
| 2002/0069635 A1 | 6/2002 | Tsukamoto | |
| 2003/0070413 A1 * | 4/2003 | Fujiwara et al. ............... 57/210 |

FOREIGN PATENT DOCUMENTS

| | | |
|---|---|---|
| EP | 1 179 698 | 2/2002 |
| EP | 1 193 428 | 4/2002 |
| GB | 2 285 067 | 6/1995 |
| JP | 3-249482 | 11/1991 |
| JP | 10-132086 | 5/1998 |

* cited by examiner

*Primary Examiner*—Shaun R. Hurley
(74) *Attorney, Agent, or Firm*—Koda & Androlia

(57) ABSTRACT

A gland packing including strip-like expanded graphite is disposed on one face of a sheet-like reinforcing member configured by a fibrous material to form a strip-like base member. The base member is stranded to be formed as a cord-like member. The outside of the cord-like member is covered by a portion of the strip-like expanded graphite, and the whole reinforcing member and the remaining portion of the strip-like expanded graphite are involved in the cord-like member. A large number of openings are formed in the reinforcing member. The strip-like expanded graphite faces the openings. The strip-like expanded graphite is engaged with the openings.

10 Claims, 17 Drawing Sheets

MATERIAL FOR GLAND PACKING AND THE GLAND PACKING

TECHNICAL FIELD

The present invention relates to a gland packing material which is useful in production of a gland packing, and also to a gland packing which is produced by the gland packing material.

BACKGROUND ART

Conventionally, as a gland packing material which is useful in production of a gland packing, for example, known is a material disclosed in Japanese Patent No. 3,101,916.

In the conventional art, as shown in FIG. 21, for example, expanded graphite (52) is bonded by an adhesive agent to both faces of a plurality of reinforcing fiber yarns (51), thereby forming a gland packing material (50) in which the interior is reinforced (hereinafter, such reinforcement is referred to as internal reinforcement).

The conventional gland packing material (50) is provided with high tensile strength by the reinforcing fiber yarns (51), and hence can be subjected to a braiding or twisting process. When a plurality of such gland packing materials (50) are bundled, and then a braiding or twisting process is applied to the bundle, therefore, a gland packing can be produced. When eight gland packing materials (50) are bundled and an eight-strand square-knitting process is conducted, for example, a gland packing (53) which is braided as shown in FIG. 22 is produced, and, when six gland packing materials (50) are bundled and a twisting process is applied, a gland packing (53) which is twisted as shown in FIG. 23 is produced.

Each of the conventional gland packings (53) is provided by the expanded graphite (52) with properties which are preferable in sealing, and which are inevitable in a packing, such as the compressibility and the recovery property, and hence can seal a shaft seal part of a fluid apparatus while producing a high sealing property.

In the conventional gland packing material (50) having the internal reinforcement, however, the expanded graphite (52) which covers the both faces of the reinforcing fiber yarns (51) is not expected to exert a high shape-retaining property. When the gland packing (53) is produced with using such a gland packing material (50) having the poor shape-retaining property, the expanded graphite (52) may drop off during the braiding or the twisting process. Therefore, the elasticity of the gland packing (53) is reduced, the properties which are preferable in sealing, such as the compressibility and the recovery property are lost, and the sealing property of the gland packing (53) is lowered.

A large amount of adhesive agent is used in order to bond the reinforcing fiber yarns (51) and the expanded graphite (52) together. Therefore, the properties of the expanded graphite (52) such as the affinity and the compression recovery property are lowered by hardening of the adhesive agent, thereby adversely affecting the sealing property. When the gland packing (53) produced by the gland packing material (50) is used under a high temperature condition, the adhesive agent may be burned, thereby causing a possibility that penetration leakage is increased and the sealing property is reduced.

The invention has been developed in view of the above-described circumstances. It is an object of the invention to provide a gland packing material which is provided with high tensile strength by a fibrous material that reinforces the interior, which can be easily subjected to a braiding or twisting process, which can obtain a high shape-retaining property, and in which a high sealing property that is originally possessed by an internal reinforcement structure is not impaired, and reduction of the sealing property due to hardening or burning of an adhesive agent can be avoided, and a gland packing which is produced with using the gland packing material.

DISCLOSURE OF THE INVENTION

In order to attain the object, for example, the invention is configured in the manner which will be described with reference to FIGS. 1 to 20 showing embodiments of the invention.

Namely, the invention relates also to a gland packing material, and is characterized in that the material is configured by a cord-like member (40) which is formed by stranding a strip-like base member (4), or winding a strip-like base member (4) about a longitudinal direction, or winding a strip-like base member (4) about a longitudinal direction and then stranding the base member, the base member (4) comprises: a reinforcing member (20) configured by a fibrous material (2); and a strip-like expanded graphite (3), the strip-like expanded graphite (3) is disposed at least on one face of the reinforcing member (20), a portion of the strip-like expanded graphite (3) is placed outside the cord-like member (40), the reinforcing member (20) is involved in the cord-like member (40), a large number of openings (20A) are formed in the reinforcing member (20), and the strip-like expanded graphite (3) faces the openings (20A).

The invention relates to a gland packing, and is characterized in that a plurality of the gland packings (1) are used, and braided or twisted.

According to the configuration, the invention has the following advantages.

The cord-like member has an internal reinforcement structure in which the strip-like expanded graphite is placed on an outer side, and the sheet-like reinforcing member configured by a fibrous material is placed inside, and which is surely reinforced by the reinforcing member.

Moreover, the many openings are formed in the reinforcing member, and the strip-like expanded graphite faces the openings. Therefore, a so-called anchor effect in which the expanded graphite is engaged with the openings is produced. Because of the anchor effect, the coupling force between the strip-like expanded graphite and the reinforcing member is enhanced, and hence the shape-retaining property of the gland packing material is high. As a result, even when a used amount of an adhesive agent for coupling the strip-like expanded graphite with the reinforcing member is restricted to zero or a very small amount, the reinforcing member is hardly separated from the strip-like expanded graphite during braiding or a twisting process of producing a gland packing, and the internal reinforcement effect due to the reinforcing member can be effectively exerted.

Since the used amount of an adhesive agent can be restricted to zero or a very small amount, it is possible to suppress the properties of the strip-like expanded graphite such as the affinity and the compression recovery property from being lowered by hardening of the adhesive agent.

Since the reinforcing member and the strip-like expanded graphite are partly involved in the cord-like member, the reinforcing member is hardly separated from the strip-like expanded graphite during braiding or a twisting process of producing a gland packing, so that the shape-retaining property of the gland packing material can be enhanced and the internal reinforcement effect can be effectively exerted.

Since the reinforcing member is involved in the cord-like member, a sandwich structure in which a portion of the strip-like expanded graphite is sandwiched by the reinforcing member is formed, so that, in the case where the packing is compressed or a pressure is applied to the packing, movement of expanded graphite particles is suppressed. Therefore, the shape-retaining property of the gland packing material can be further improved.

Moreover, properties which are preferable in sealing, such as the compressibility and the recovery property are produced by the strip-like expanded graphite, and the strip-like expanded graphite is placed outside the cord-like member. Therefore, the gland packing material can obtain a high sealing property.

The gland packing material has a high sealing property and an excellent shape-retaining property. In a gland packing which is produced with using a plurality of such gland packing materials, therefore, the expanded graphite is prevented from dropping off during the braiding or the twisting process. As a result, in the gland packing, the elasticity is not reduced, and the properties which are preferable in sealing, such as the compressibility and the recovery property can be held. In the case where the packing is compressed or a pressure is applied to the packing, movement of expanded graphite particles is suppressed. Therefore, the sealing face pressure is prevented from being lowered, so that the pressure resistance performance can be improved, and the pressure contact force to be applied to the counter member is kept to a high level, so that the sealing property can be improved. As a result, the gland packing can satisfactorily seal a shaft seal part of a fluid apparatus or the like.

In the gland packing material, moreover, the used amount of an adhesive agent can be restricted to zero or a very small amount. Even when the gland packing using the gland packing material is used under a high temperature condition, reduction of the sealing property due to burning of the adhesive agent can be suppressed.

In the cord-like member, only a portion of the outer side may be covered by the strip-like expanded graphite. When a whole outside of the cord-like member is covered by the strip-like expanded graphite, however, the properties of the strip-like expanded graphite which are preferable in sealing can be exerted more effectively.

The strip-like expanded graphite may be disposed only on one face of the reinforcing member. Alternatively, the strip-like expanded graphite may be disposed on both faces of the reinforcing member. In this case, a double structure in which the strip-like expanded graphite sandwiches the reinforcing member is formed, and hence the properties which are preferable in sealing, such as the compressibility and the recovery property are further improved, so that a higher sealing property can be obtained. Since the strip-like expanded graphite is disposed on the both faces of the reinforcing member, the contact area between the reinforcing member and the strip-like expanded graphite is widened, and the coupling force between the strip-like expanded graphite and the reinforcing member can be further enhanced through the many openings disposed in the reinforcing member.

For example, the sheet-like reinforcing member configured by a fibrous material may be configured by a fiber-opened sheet in which multifilament yarns are opened in a sheet-like shape.

In this case, a thickness of the fiber-opened sheet is preferably set to 10 µm to 300 µm, and more preferably to 30 µm to 100 µm. According to the configuration, the fiber-opened sheet can be easily produced, the sheet can be easily stranded, and the internal reinforcement effect can be enhanced.

As the fibrous material, one or two or more selected from the group consisting of carbon fibers and other brittle fibers, and tough fibers may be used. When each fiber is excessively thin, such a fibrous material may be broken during a stranding process, and, when each fiber is excessively thick, the fibrous material is hardly stranded. Therefore, the diameter of each fiber is preferably 3 µm to 15 µm, and more preferably in a range of 5 µm to 9 µm.

In the case where carbon fibers or brittle fibers are used as the fibrous material, the tensile strength is high, and an excellent heat resistance can be attained. In the case where carbon fibers are used, particularly, these performances can be exerted more satisfactorily. In the case where other brittle fibers are used, the invention can be economically implemented.

Specific examples of the brittle fibers are glass fibers, silica fibers, and ceramic fibers such as alumina and alumina-silica. One or two or more selected from the group consisting of these fibers can be used.

In the case where tough fibers are used as the fibrous material, the fibrous material can be easily produced with using thin fibers because the fibers have high bendability and exert excellent workability. An economical gland packing material can be provided because the fibers have high productivity. When such a gland packing material is used, not only a gland packing having a large diameter, but also a gland packing having a small diameter can be easily produced, and moreover it is possible to produce a gland packing which has high durability, and which is economical.

Furthermore, specific examples of the tough fibers are metal fibers, aramid fibers, and PBO (poly-p-phenylenebenzobisoxazole) fibers. One or two or more selected from the group consisting of these fibers can be used.

BRIEF DESCRIPTION OF THE DRAWINGS

FIGS. 1 to 6 show a first embodiment of the gland packing material of the invention, FIG. 1 is a perspective view of the gland packing material, FIG. 2 is a partial enlarged plan view showing a state where expanded graphite faces many openings of a reinforcing member configured by a fibrous material, FIG. 3 is a section view taken along the line A—A in FIG. 2, FIG. 4 is a perspective view showing a fiber bundle, FIG. 5 is a perspective view showing a fiber-opened sheet, and FIG. 6 is a perspective view of a base member.

FIG. 7 is a perspective view of strip-like expanded graphite in a state where a small amount of adhesive agent is used, and showing a modification of a procedure of producing the base member.

FIGS. 8 and 9 show another modification of the procedure of producing the base member, FIG. 8 is a section view showing a state where expanded graphite powder is superimposed on a fiber-opened sheet, and FIG. 9 is a section view of the base member.

FIGS. 10 to 12 show modifications of the base member in the first embodiment, FIG. 10 is a section view of a base member in a first modification, FIG. 11 is a section view of a base member in a second modification, and FIG. 12 is a section view of a base member in a third modification.

FIG. 13 is a perspective view showing a second embodiment of the gland packing material of the invention.

FIGS. 14 and 15 show a third embodiment of the gland packing material of the invention, FIG. 14 is a section view of a base member, and FIG. 15 is a perspective view of the gland packing material.

FIGS. 16 and 17 show modifications of the base member in the third embodiment, FIG. 16 is a section view of a base member in a first modification, and FIG. 17 is a section view of a base member in a second modification.

FIG. 18 is a perspective view showing a fourth embodiment of the gland packing material of the invention.

FIG. 19 is a perspective view showing an embodiment of the gland packing of the invention.

FIG. 20 is a perspective view showing another embodiment of the gland packing of the invention.

FIG. 21 is a perspective view of a gland packing material of the conventional art.

FIG. 22 is a perspective view of a gland packing which is formed by braiding the gland packing material of the conventional art, and FIG. 23 is a perspective view of a gland packing which is formed by twisting the gland packing material of the conventional art.

BEST MODE FOR CARRYING OUT THE INVENTION

Hereinafter, preferred embodiments of the invention will be described with reference to the drawings.

Figure 1:
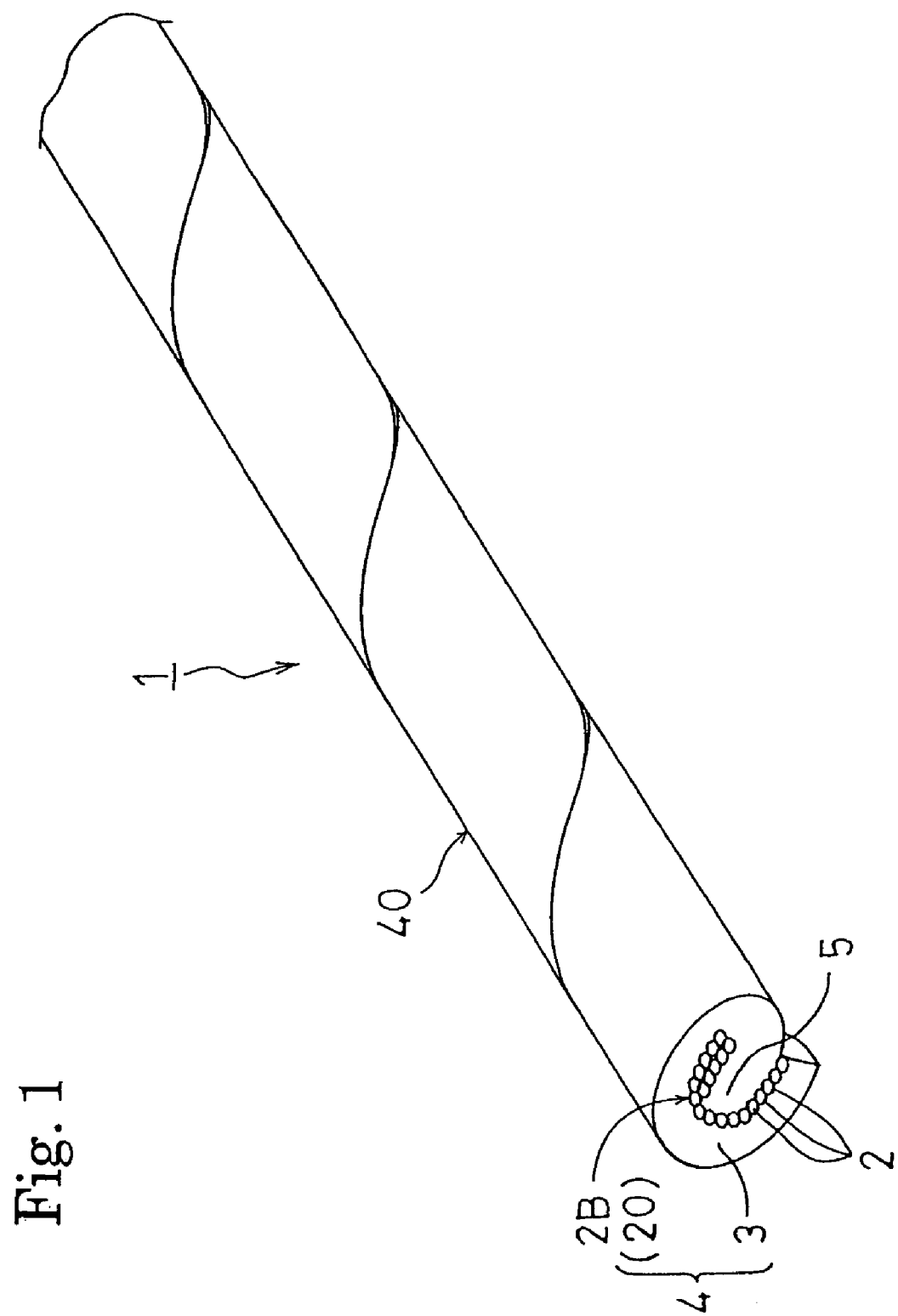
FIGS. 1 to 20 show embodiments of the invention.

FIG. 1 is a perspective view showing a first embodiment of the gland packing material of the invention. Referring to the figure, the gland packing material (1) is configured by a cord-like member (40) which is formed by sequentially stranding a strip-like base member (4) in the longitudinal direction with starting from an end. The base member (4) comprises: a sheet-like reinforcing member (20) configured by many long carbon fibers (2) which are very thin; and a strip-like expanded graphite (3). The reinforcing member (20) is disposed on one face of the strip-like expanded graphite (3). The stranding process is applied so that the strip-like expanded graphite (3) is directed outward, and the reinforcing member is directed inward. As a result of the stranding process, the whole reinforcing member (20) and one end portion (5) in the width direction of the strip-like expanded graphite (3) are involved in the cord-like member (40). Namely, the cord-like member (40) is in the state where a portion of the strip-like expanded graphite (3) is placed in the whole outer side, and the reinforcing member (20) is covered by the strip-like expanded graphite (3), and the gland packing material (1) is configured to have an internal reinforcement structure in which the sheet-like reinforcing member (20) is interposed between the strip-like expanded graphite (3).

Figure 2:
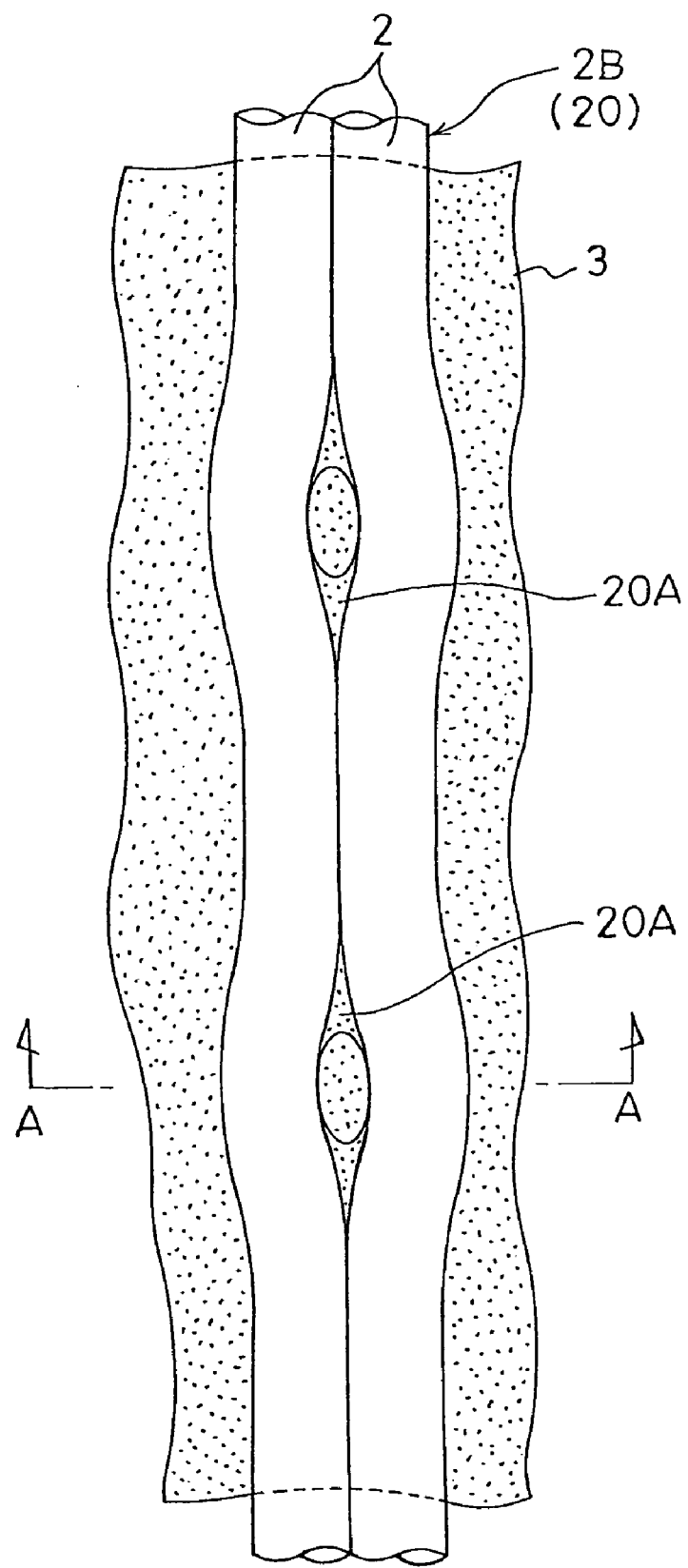
Figure 3:
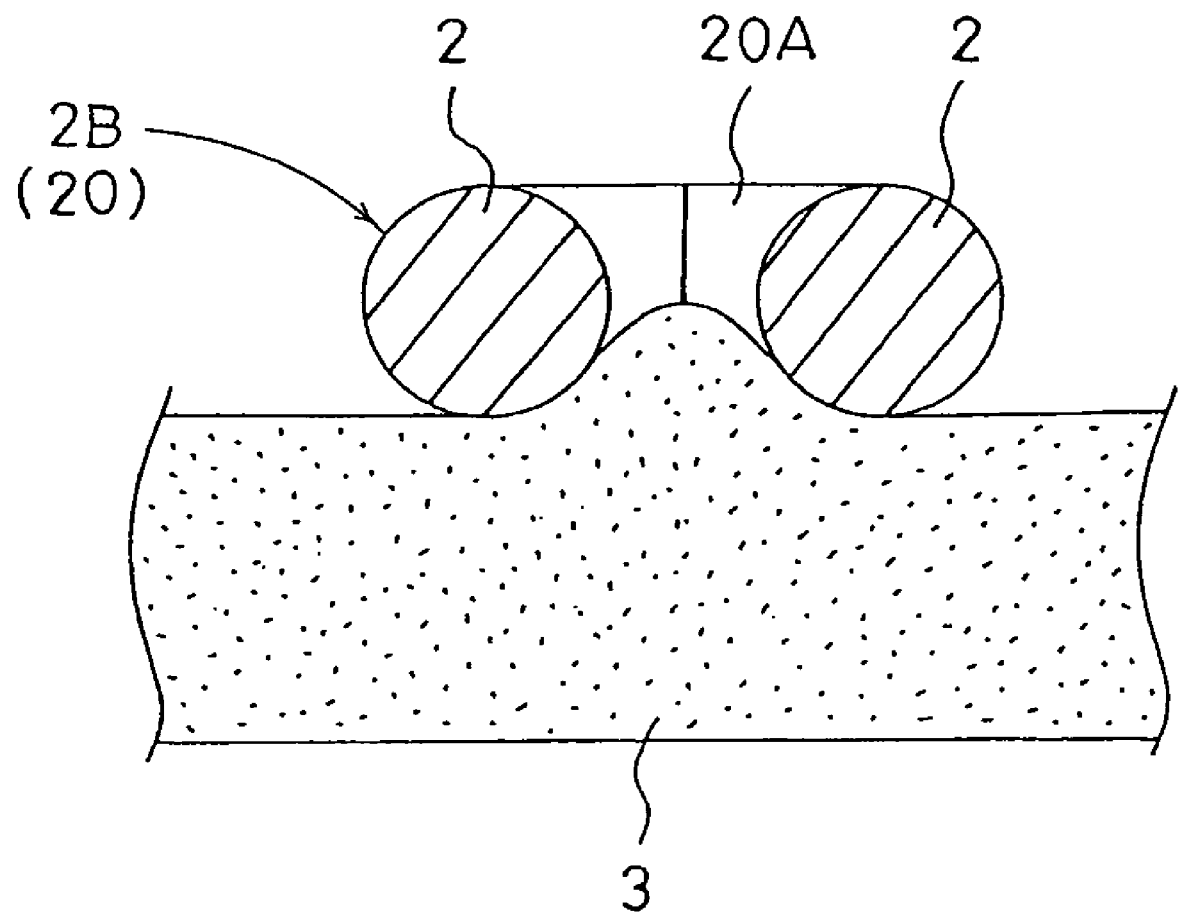

As shown in FIGS. 2 and 3, the reinforcing member (20) comprises a large number of openings (20A), and the strip-like expanded graphite (3) faces the openings (20A). The many openings (20A) are formed in a case where the openings are spontaneously formed when the reinforcing member (20) configured by many long carbon fibers (2) which are very thin are stranded, or a case where many portions of the reinforcing member (20) are slightly forcedly torn in such a manner that adjacent carbon fibers (2) are separated from each other, and local clefts are previously formed in an artificial manner before the stranding process.

The carbon fibers (2) have a property that they are hardly broken by an external force of the level of stranding. Therefore, it is possible to obtain the gland packing material (1) having an internal reinforcement structure in which the reinforcing member (20) configured by the carbon fibers (2) is covered by the strip-like expanded graphite (3). Furthermore, the strip-like expanded graphite (3) faces the many openings (20A) formed in the reinforcing member (20) configured by the carbon fibers (2), and the strip-like expanded graphite (3) is engaged with the openings (20A) to produce a so-called anchor effect. Because of the anchor effect, the coupling force between the strip-like expanded graphite (3) and the reinforcing member (20) is enhanced, and hence the use of an adhesive agent can be omitted. In a process in which the gland packing material (1) is braided or twisted in order to produce a gland packing which will be described later, namely, the reinforcing member (20) is hardly separated from the strip-like expanded graphite (3) even when an adhesive agent is not used. Therefore, the shape-retaining property of the gland packing material (1) can be enhanced, and the internal reinforcement effect due to the reinforcing member (20) can be effectively exerted. The omission of the use of an adhesive agent suppresses the properties of the strip-like expanded graphite (3) such as the affinity and the compression recovery property from being lowered by hardening of the adhesive agent.

In the gland packing material (1), the whole reinforcing member (20) and the one end portion (5) in the width direction of the strip-like expanded graphite (3) are involved in the cord-like member (40). According to the configuration also, the reinforcing member (20) is hardly separated from the strip-like expanded graphite (3) when the gland packing is produced, so that the shape-retaining property of the gland packing material (1) can be enhanced and the internal reinforcement effect can be effectively exerted.

The properties which are preferable in sealing, such as the compressibility and the recovery property are provided by the strip-like expanded graphite (3), and the strip-like expanded graphite (3) is placed outside of the cord-like member. Therefore, the gland packing material (1) can obtain a high sealing property.

Since the whole reinforcing member (20) and a portion of the strip-like expanded graphite (3) are involved in the cord-like member (40), a sandwich structure in which a portion of the strip-like expanded graphite (3) is sandwiched by the reinforcing member (20) is formed. In the case where the packing is compressed or a pressure is applied to the packing, therefore, movement of expanded graphite particles is suppressed. Therefore, the shape-retaining property of the gland packing material (1) can be further improved. In the gland packing which is formed by the gland packing material (1), when the packing is compressed or a pressure is applied to the packing, movement of expanded graphite particles is suppressed. Therefore, the sealing face pressure is prevented from being lowered, so that the pressure resistance performance can be improved, and the pressure contact force to be applied to the counter member is kept to a high level, so that the sealing property can be improved.

For example, the gland packing material (1) can be produced in the following procedure.

First, the base member (4) is formed in the following procedure.

Figure 4:
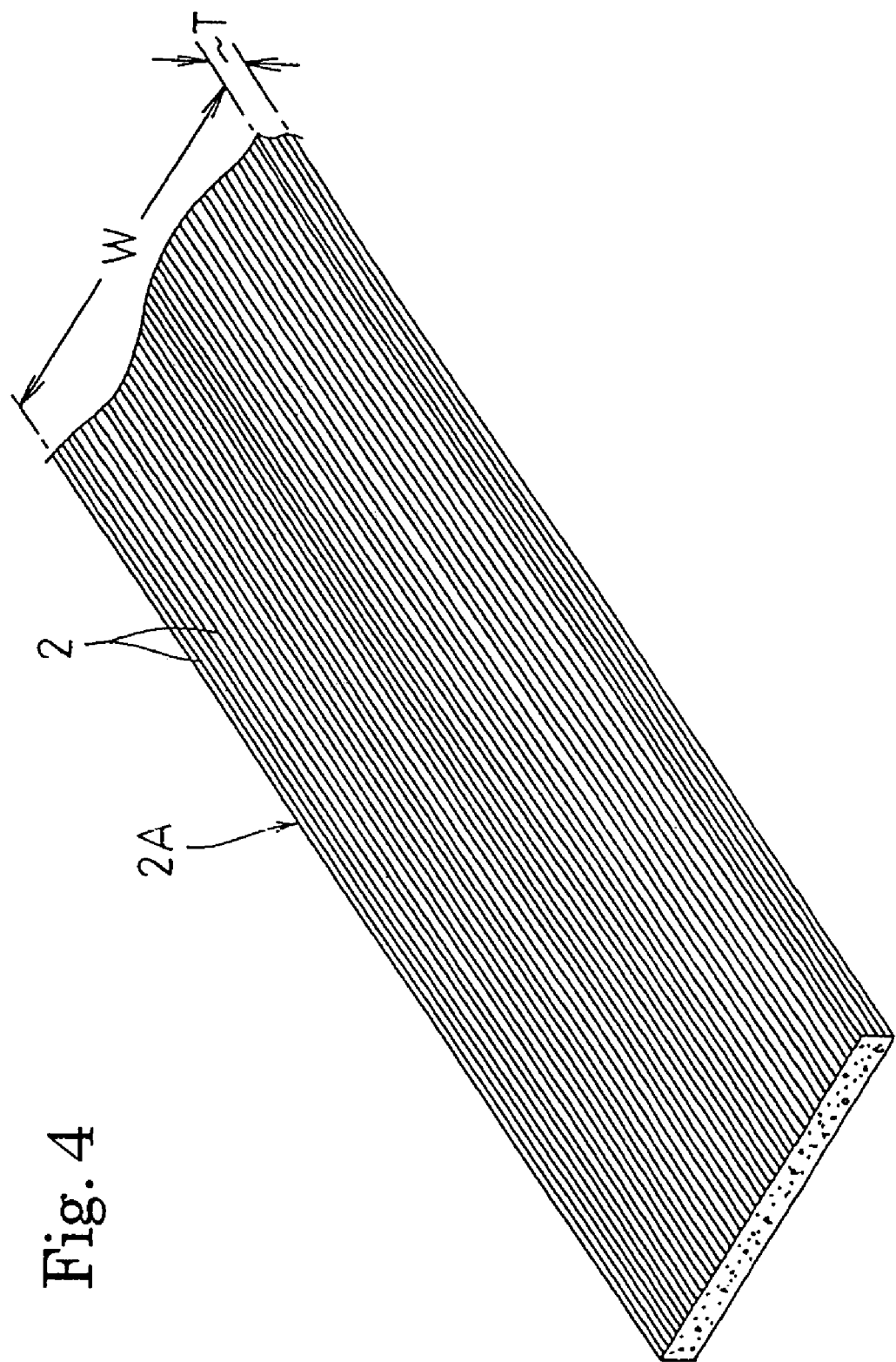
Figure 5:
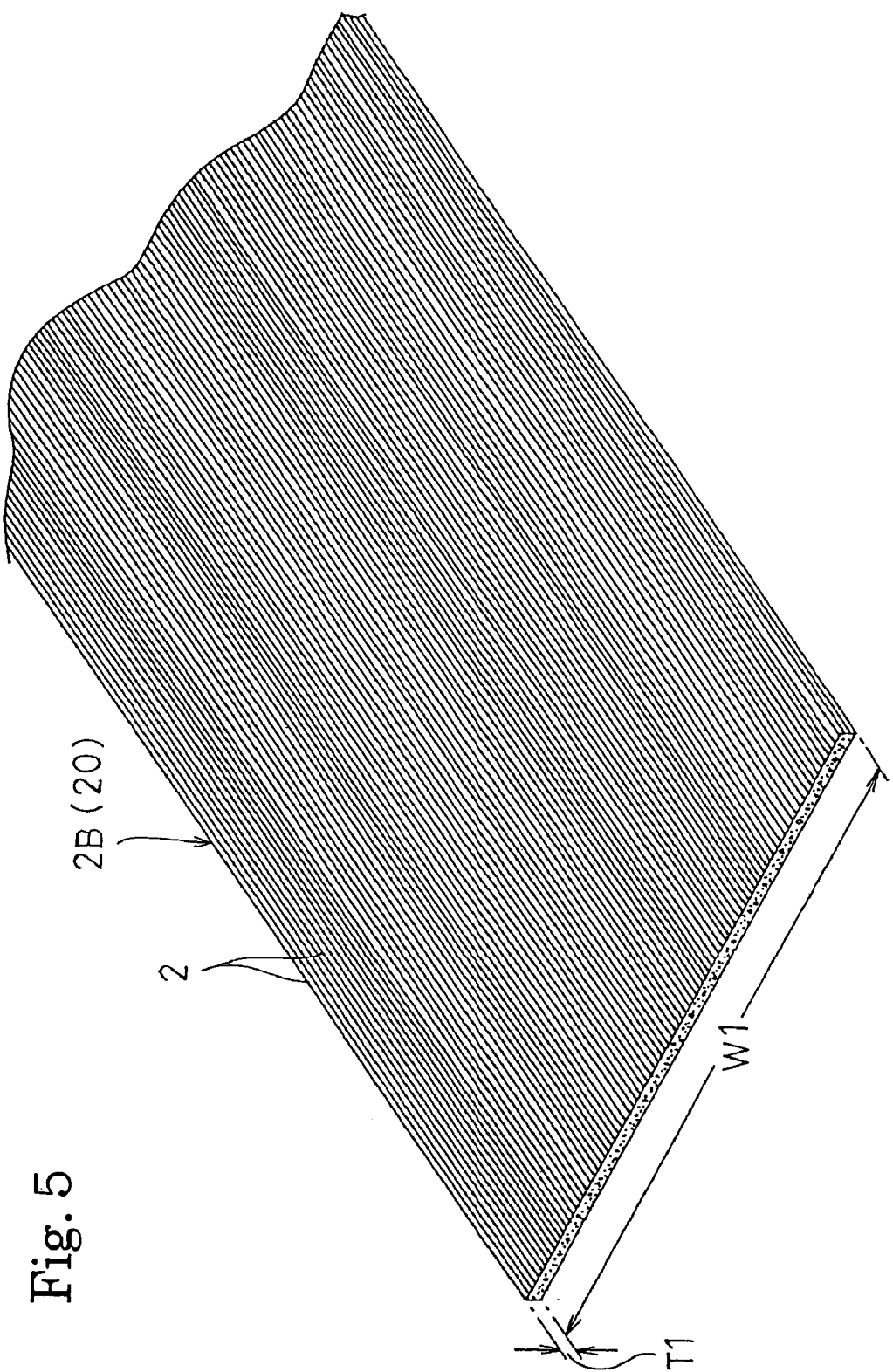

As shown in FIG. 4, initially, a multifilament yarn in which, for example, 12,000 carbon fibers (2) each having a diameter of 7 μm are bundled is used to form a carbon fiber bundle (2A) in which the fibers are bundled in a flat shape having a width (W)=4.00 mm and a thickness (T)=0.20 mm. Then, the carbon fiber bundle (2A) is fiber-opened to a sheet-like shape so as to be extended in the width direction, whereby a fiber-opened sheet (2B) having a width (W1) =25.00 mm and a thickness (T1)=0.03 mm is formed as shown in FIG. 5.

For example, the fiber opening process is conducted in the following manner. First, the carbon fiber bundle (2A) is heated to soften a sizing agent for the fiber bundle, and the carbon fiber bundle (2A) is fed in the longitudinal direction while controlling the speed of the fiber bundle. An air flow is blown in a crossing direction while maintaining a predetermined overfeed amount. In a portion where the air flow passes, the carbon fiber bundle (2A) is arcuately strained to be unbound in the width direction, and the sizing agent is cooled and hardened, thereby forming the extended fiber-opened sheet (2B).

Figure 6:
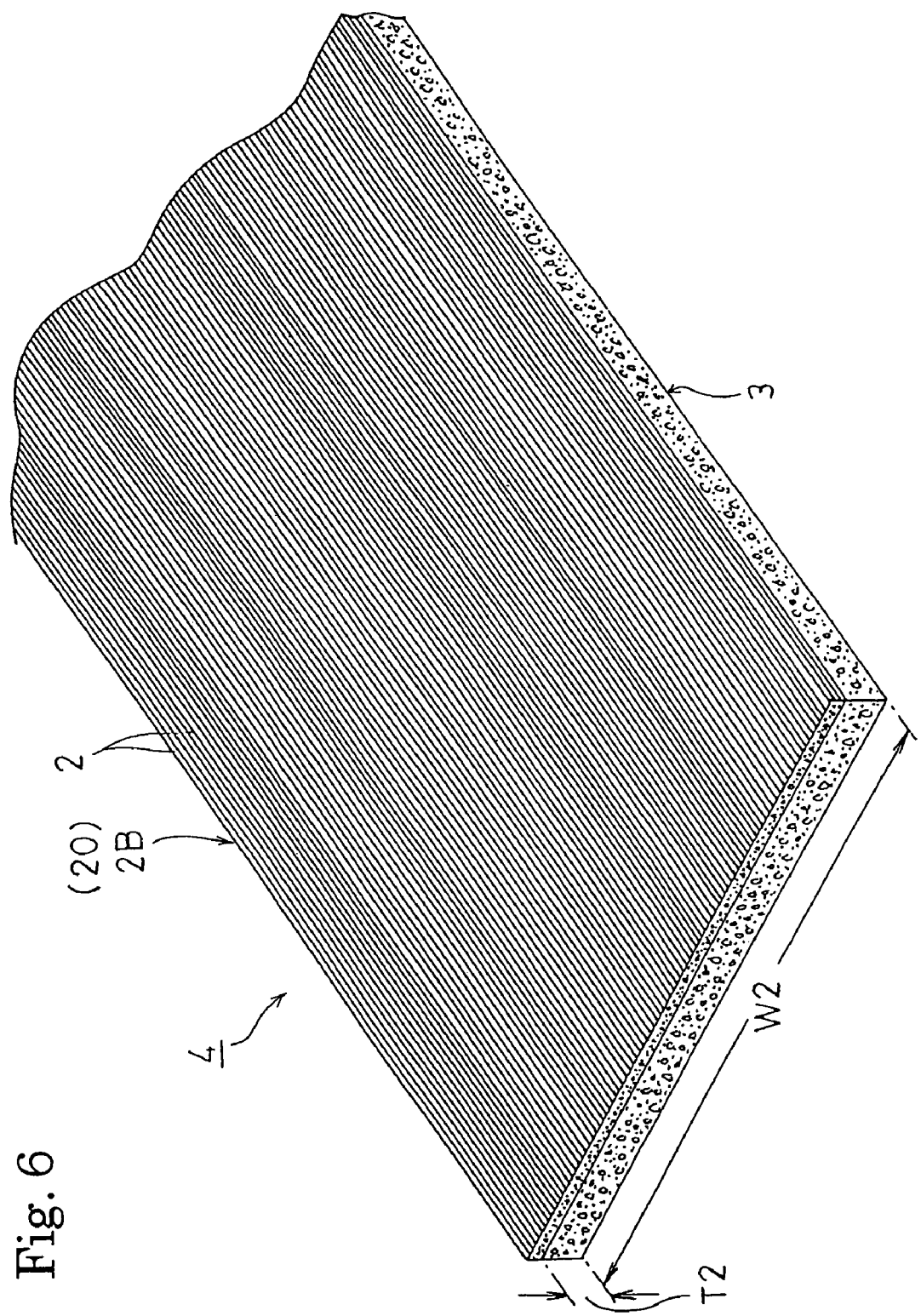

As shown in FIG. 6, next, the fiber-opened sheet (2B) is laid on one face of the strip-like expanded graphite (3) having a width (W2)=25.00 mm and a thickness (T2)=0.25 mm, to form the base member (4) in which the sheet-like reinforcing member (20) configured by the carbon fibers (2) is disposed on one face of the strip-like expanded graphite (3).

Then, the base member (4) is stranded to be formed into the cord-like member (40), thereby producing the gland packing material (1).

Figure 7:
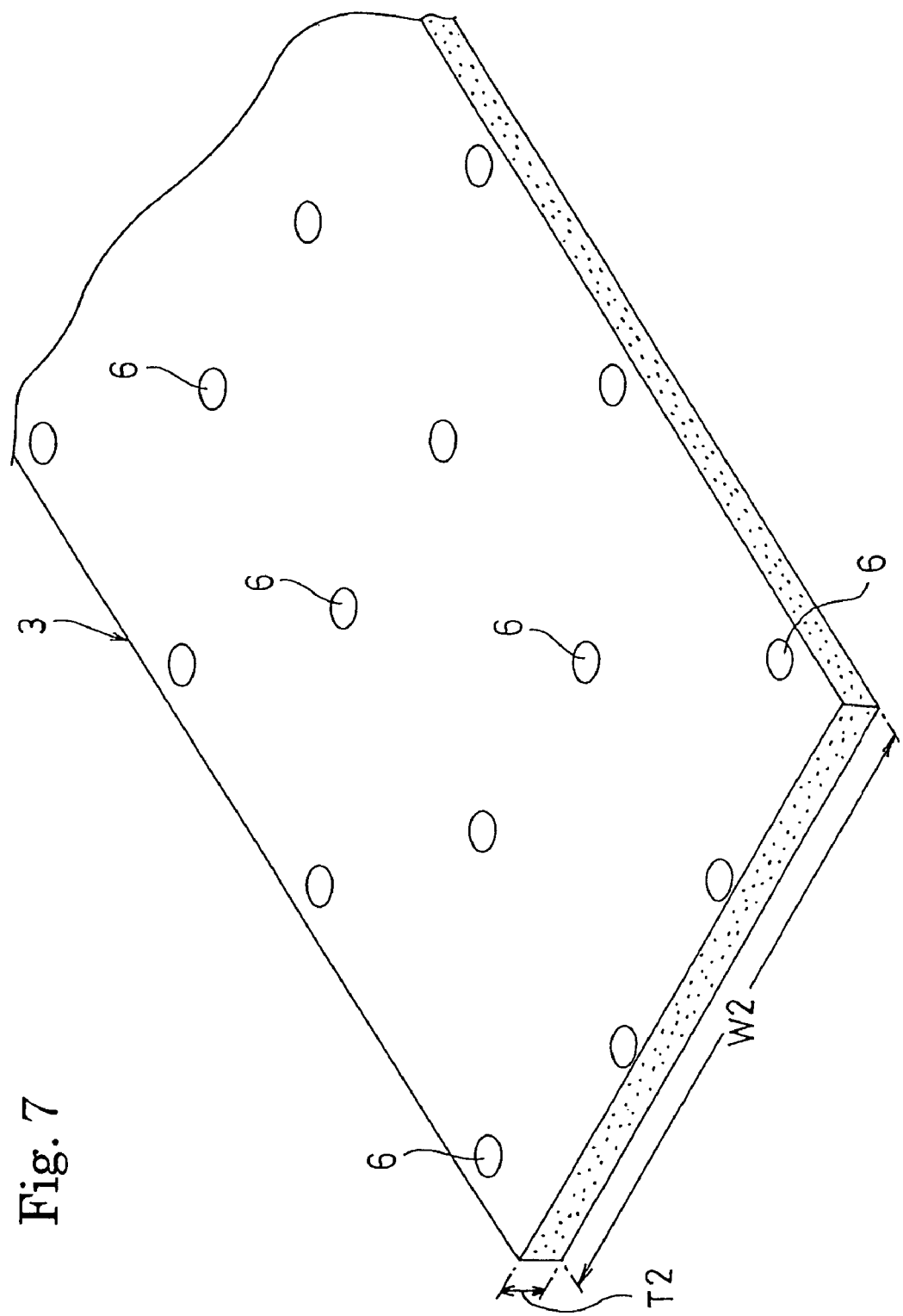

Preferably, an adhesive agent is omitted in the base member (4). However, the coupling force between the reinforcing member (20) and the strip-like expanded graphite (3) may be enhanced by using a small amount of adhesive agent. Specifically, as shown in FIG. 7, for example, an adhesive agent (6) of epoxy resin, acrylic resin, phenol resin, or like resin may be disposed in a spot-like manner on one face of the strip-like expanded graphite (3) having a width (W2)=25.00 mm and a thickness (T2)=0.25 mm, and the fiber-opened sheet (2B) may be laid on one face of the strip-like expanded graphite (3) in this state to form the base member (4). The adhesive agent (6) is used in a spot-like manner so that the used amount is restricted to a very small level. Therefore, the properties of the strip-like expanded graphite (3) such as the affinity and the compression recovery property are prevented from being lowered by hardening of the adhesive agent (6).

Figure 8:
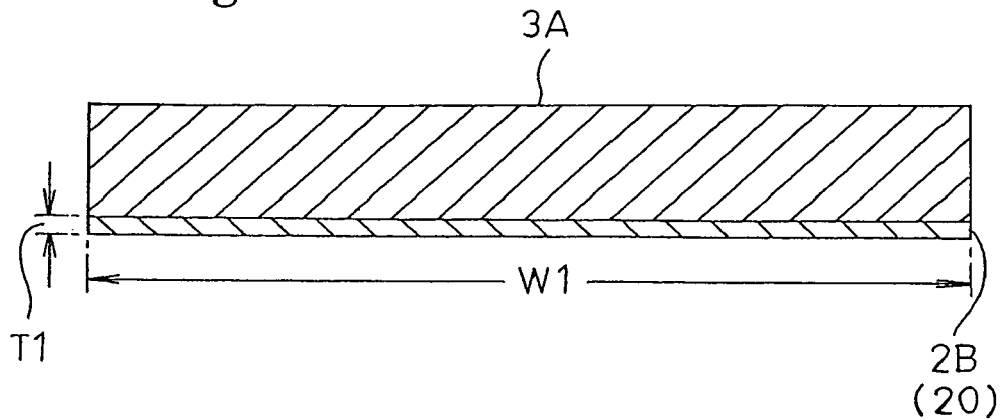
Figure 9:
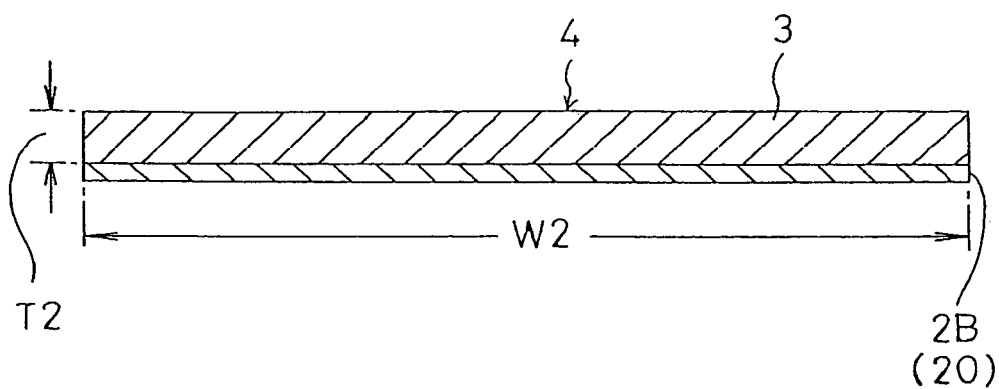

Alternatively, as shown in FIGS. 8 and 9, for example, the base member (4) may be formed by, when expanded graphite powder is to be compression-molded to the strip-like expanded graphite (3), disposing the reinforcing member (20) to be integrated with one face of the strip-like expanded graphite (3). Specifically, as shown in FIG. 8, expanded graphite powder (3A) is superimposed on the fiber-opened sheet (2B) having a width (W1)=25.00 mm and a thickness (T1)=0.03 mm. A compression-molding process is then applied, thereby forming the base member (4) in which, as shown in FIG. 9, the reinforcing member (20) configured by the fiber-opened sheet (2B) is disposed on one face of the strip-like expanded graphite (3) that is compressed so as to have a width (W2)=25.00 mm and a thickness (T2)=0.25 mm.

In the first embodiment, the reinforcing member (20) constituting the base member (4), and the strip-like expanded graphite (3) are formed so as to have the same width. In the invention, alternatively, their widths may be different from each other.

Figure 10:
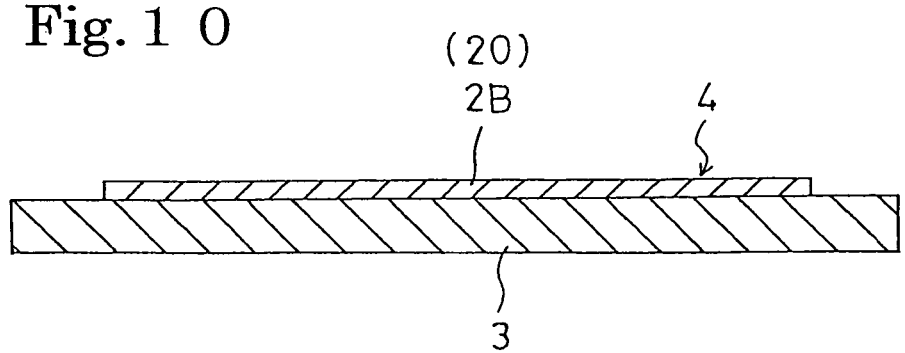
Figure 11:
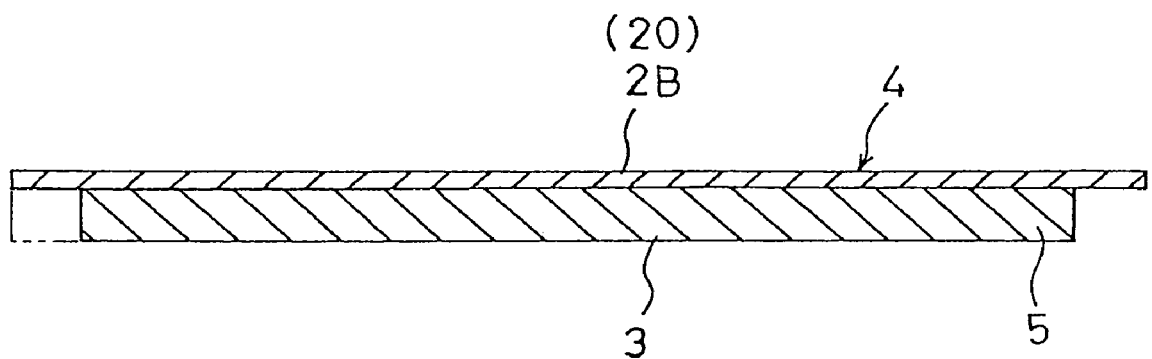

In a first modification shown in FIG. 10, for example, the base member (4) is formed by laying the fiber-opened sheet (2B) which is smaller in width than the strip-like expanded graphite (3), on one face of the strip-like expanded graphite (3).

Figure 12:
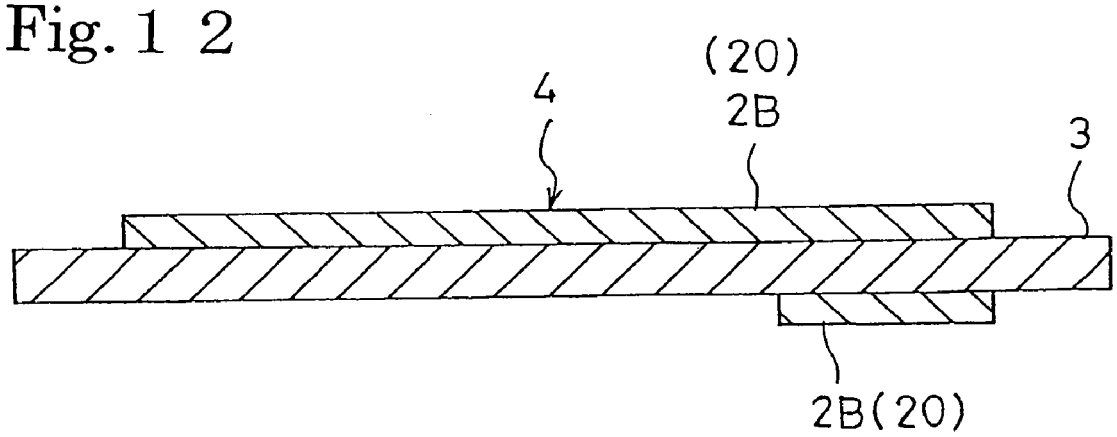

In a second modification shown in FIG. 12, the base member (4) is formed by laying the fiber-opened sheet (2B) which is larger in width than the strip-like expanded graphite (3), on one face of the strip-like expanded graphite (3). In the second modification, when both end portions in the width direction of the fiber-opened sheet (2B) protrude from the strip-like expanded graphite (3), one of the protruding end portions of the fiber-opened sheet (2B) is exposed to the outside of the cord-like member (40). Among the end portions in the width direction of the strip-like expanded graphite (3), therefore, the end portion which is opposite to one end portion (5) that is to be involved in the cord-like member (40) is preferably aligned with the end portion in the width direction of the fiber-opened sheet (2B) as indicated by the phantom line in FIG. 12.

Figure 13:
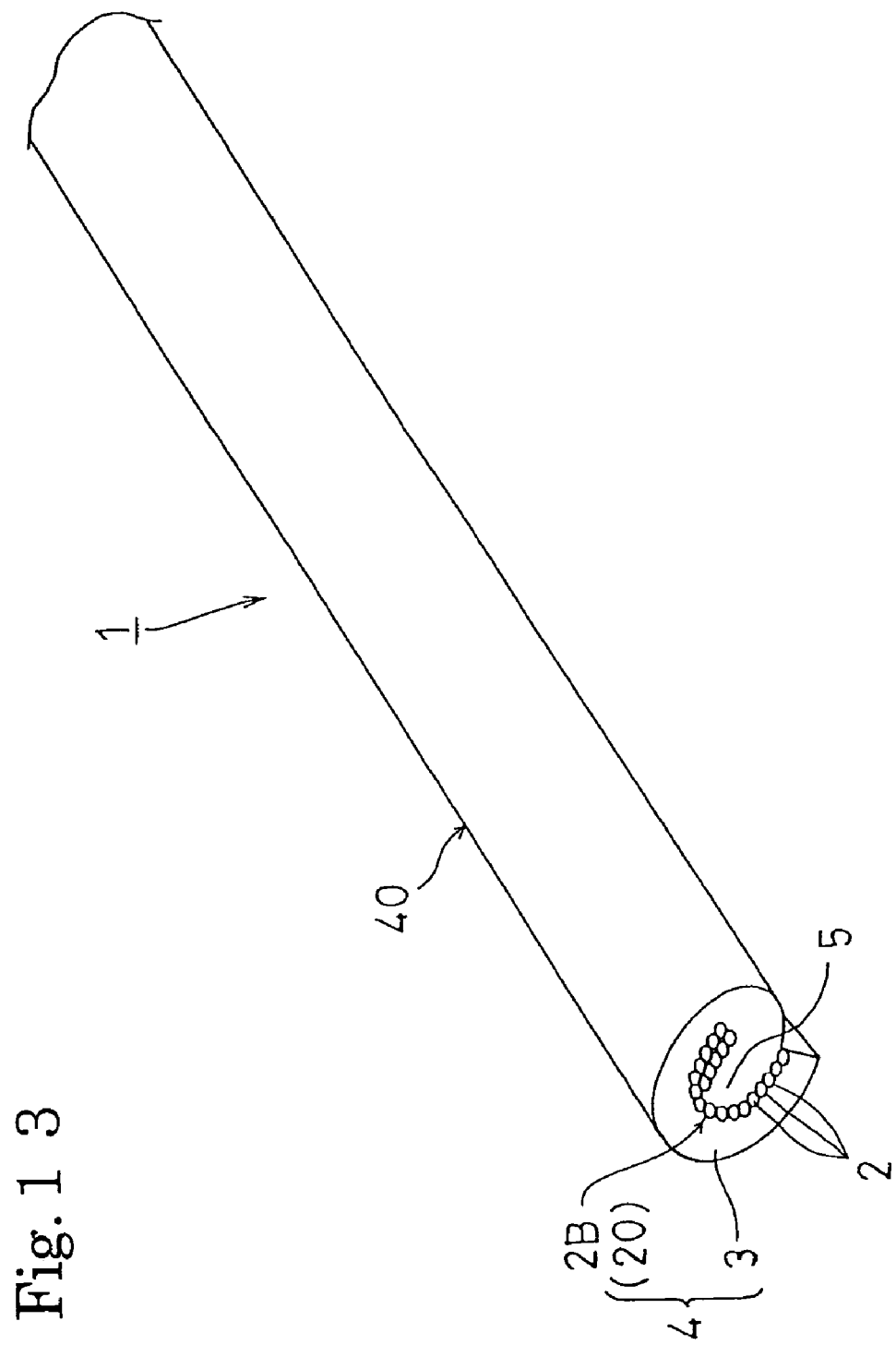

In a third modification shown in FIG. 13, the base member (4) is formed by laying a small-width fiber-opened sheet (2B) on both faces of the strip-like expanded graphite (3). In this case, when the base member (4) is stranded, one of the fiber-opened sheets (2B) may be exposed to the outside of the cord-like member (40). Therefore, it is preferable to form the one fiber-opened sheet (2B) in a portion close to one end in the width direction of the strip-like expanded graphite (3) so that, when the base member (4) is stranded, the sheet is involved in the cord-like member (40).

It is a matter of course that, in the fibrous material and the strip-like expanded graphite which are used in the invention, the thickness of the fibers, the number of the bundled fibers, the width of the sheet, the thickness of the sheet, the width and thickness of the strip-like expanded graphite, and the like are not restricted to those in the first embodiment described above.

As the carbon fibers (2), however, it is preferable to use fibers each having a diameter of 3 μm to 15 μm. When the diameter is smaller than 3 μm, the fibers may be broken during the stranding process, and, when the diameter is larger than 15 μm, the fibers are hardly stranded. Therefore, it is most preferable to set the diameter of the carbon fibers (2) to a range of 5 μm to 9 μm. In the invention, in place of carbon fibers, other brittle fibers, or tough fibers may be used. In the case where tough fibers such as metal fibers are used, such fibers have high bendability, and hence it is less likely that they are broken during the stranding process. In such a case, therefore, thinner fibers may be used.

Moreover, the thickness (T1) of the fiber-opened sheet (2B) is preferably set to a range of 10 μm to 300 μm, and more preferably to a range of 30 μm to 100 μm. When the thickness (T1) is smaller than 10 μm, the internal reinforcement effect is reduced, and a uniform sheet is hardly produced. When the thickness (T1) is larger than 300 μm, the internal reinforcement effect can be enhanced, but the stranding process is hardly applied.

FIG. 13 is a perspective view showing a second embodiment of the gland packing material of the invention. The gland packing material (1) of the second embodiment is configured by the cord-like member (40) which, as shown in FIG. 13, is formed by winding the base member (4) that is configured in the same manner as the first embodiment described above, about the longitudinal direction in the state where the strip-like expanded graphite (3) is directed outward and the reinforcing member (20) configured by the carbon fibers (2) is directed inward. The carbon fibers (2) are placed in parallel with the longitudinal direction of the cord-like member (40), and the whole reinforcing member (20) configured by the carbon fibers (2) is placed together with the one end portion (5) in the width direction of the strip-like expanded graphite (3) inside the cord-like member (40).

Namely, the cord-like member (40) is in the state where a portion of the strip-like expanded graphite (3) is placed in the whole outer side, and the reinforcing member (20) is covered by the strip-like expanded graphite (3), and, in the same manner as the first embodiment, the gland packing material (1) is configured to have an internal reinforcement structure in which the sheet-like reinforcing member (20) is interposed between the strip-like expanded graphite (3).

The other configuration is similar to that of the first embodiment, and functions in a similar manner. Therefore, its description is omitted.

When the gland packing material (1) of the second embodiment is stranded in a spiral manner, the material can be formed into the gland packing material (1) having an appearance which is identical with that of the first embodiment, and function and attain effects in a similar manner as the first embodiment.

Figure 14:
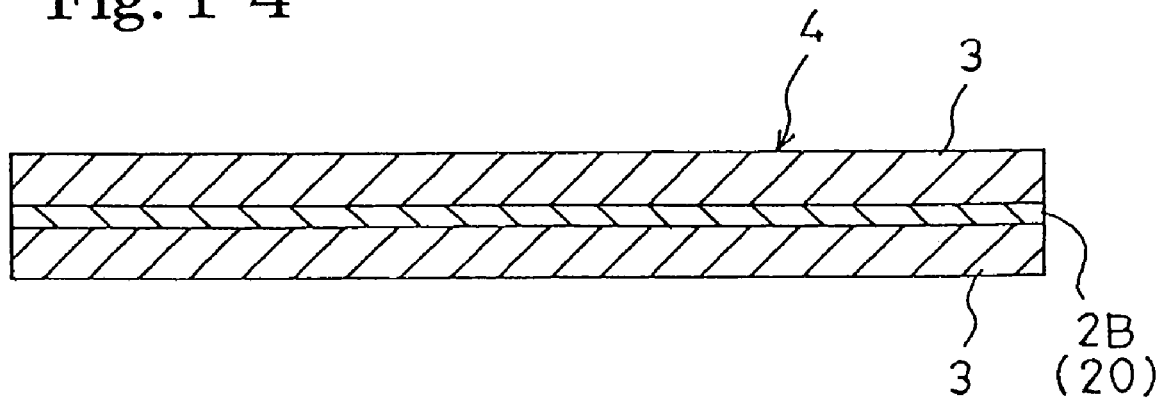
Figure 15:
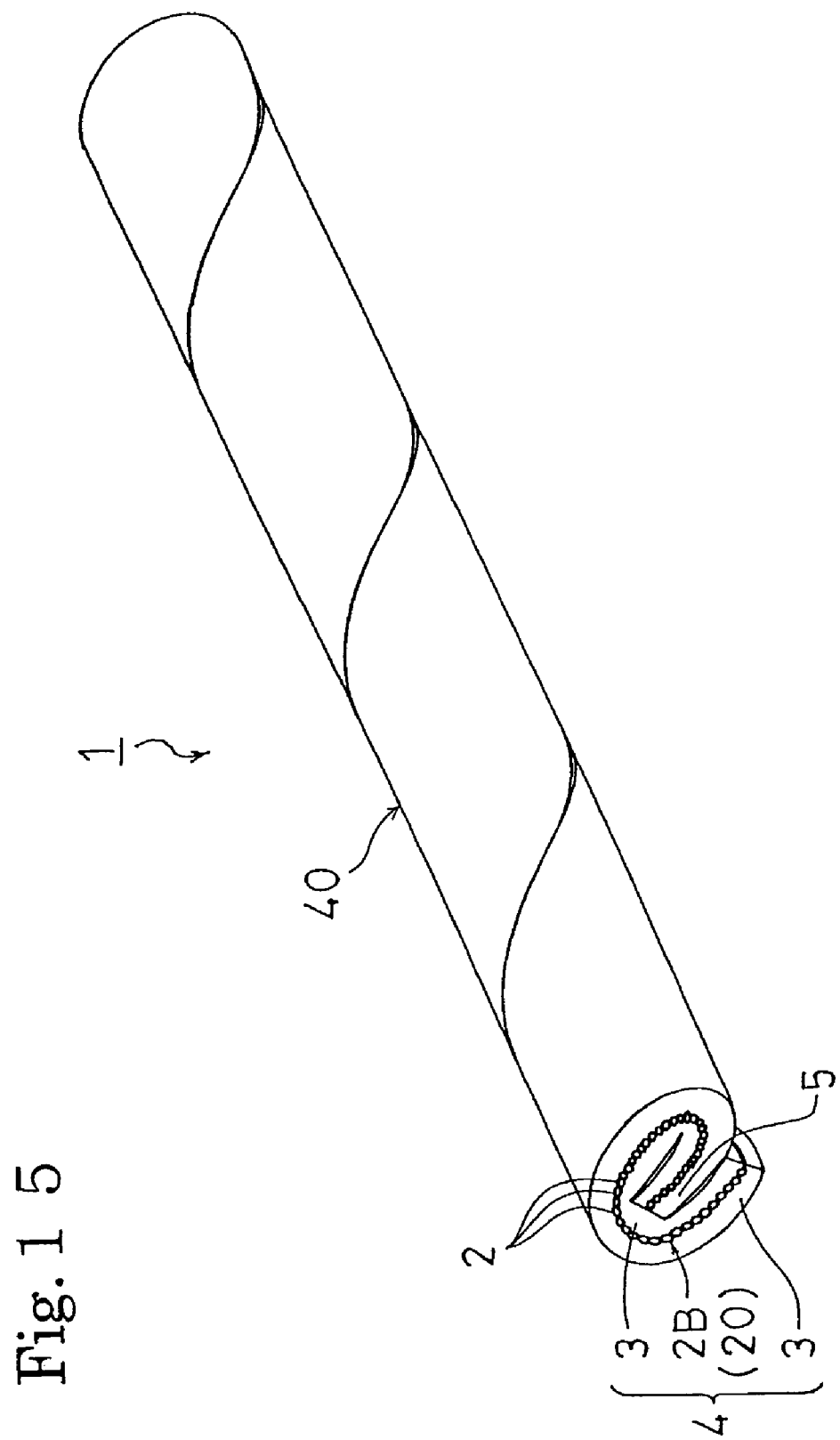

FIGS. 14 and 15 show a third embodiment of the invention.

In both the first and second embodiments described above, the strip-like expanded graphite (3) is disposed only on one face of the reinforcing member (20). By contrast, in the third embodiment, as shown in FIG. 14, the base member (4) is formed by disposing the strip-like expanded graphite (3) having a width which is equal to that of the reinforcing member (20) configured by the fiber-opened sheet (2B), on the both faces of the reinforcing member (20).

In the same manner as the first embodiment described above, the base member (4) is stranded in the longitudinal direction with starting from an end, whereby the gland packing material (1) configured by the cord-like member (40) is formed as shown in FIG. 15.

In the third embodiment, since the strip-like expanded graphite (3) is disposed on the both faces of the reinforcing member (20) configured by the carbon fibers (2), a double structure in which the strip-like expanded graphite (3) sandwiches the reinforcing member (20) is formed, and hence the properties which are preferable in sealing, such as the compressibility and the recovery property are further improved, so that a higher sealing property can be obtained. Since the strip-like expanded graphite (3) is disposed on the both faces of the reinforcing member (20), the contact area between the reinforcing member (20) and the strip-like expanded graphite (3) is widened. As a result, the coupling force between the strip-like expanded graphite (3) and the reinforcing member (20) can be further enhanced through the many openings (20A) disposed in the reinforcing member (20).

The other configuration is similar to that of the first embodiment, and functions in a similar manner. Therefore, its description is omitted.

In the base member (4) used in the third embodiment, in the same manner as the first embodiment described above, the widths of the reinforcing member (20) and the strip-like expanded graphite (3) may be different from each other.

Figure 16:
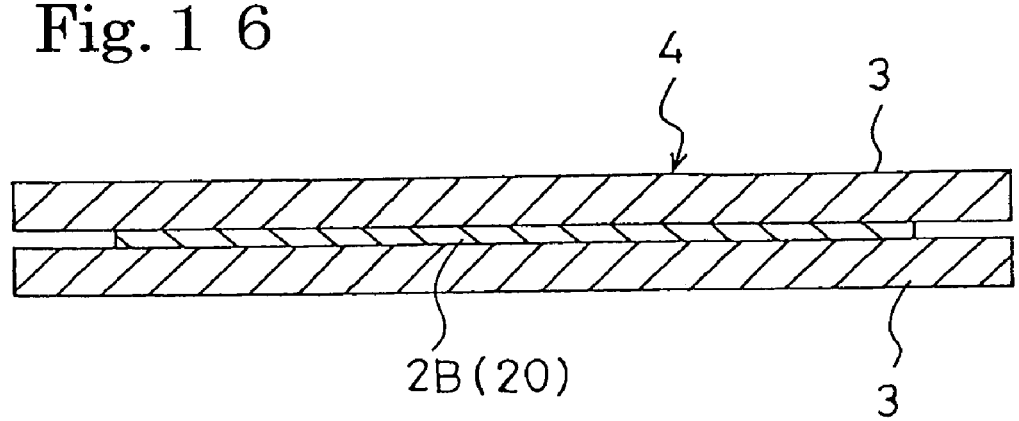

In a first modification of the third embodiment shown in FIG. 16, namely, the base member (4) is formed by laying the strip-like expanded graphites (3) which are larger in width than the fiber-opened sheet (2B), respectively on the both faces of the fiber-opened sheet (2B).

Figure 17:
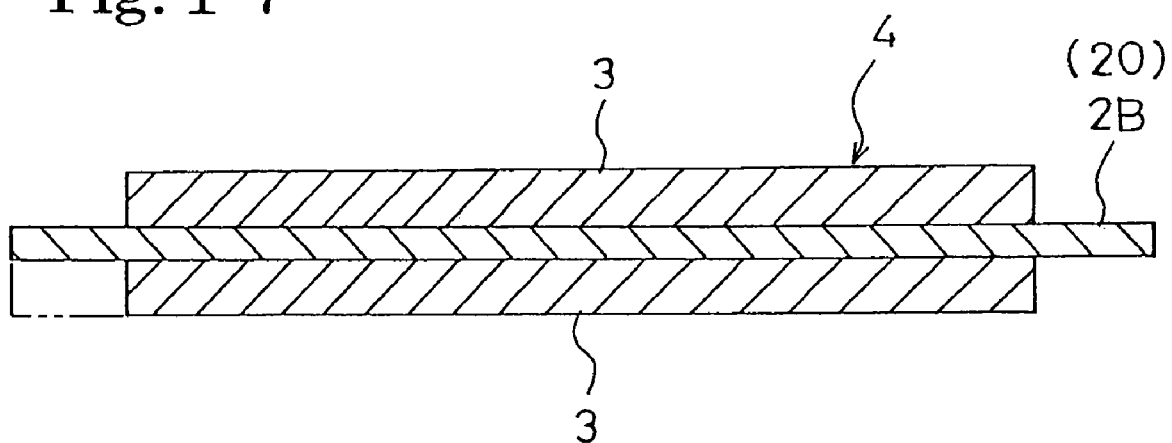

In a second modification of the third embodiment shown in FIG. 17, the base member (4) is formed by laying the strip-like expanded graphites (3) which are smaller in width than the fiber-opened sheet (2B), respectively on the both faces of the fiber-opened sheet (2B) In the same manner as the second modification of the first embodiment, one end portion in the width direction of the strip-like expanded graphite (3) which is on the outer side is preferably aligned with the end portion in the width direction of the fiber-opened sheet (2B) as indicated by the phantom line in FIG. 17.

In the invention, it is a matter of course that, when the strip-like expanded graphites (3) are to be disposed respectively on the both faces of the reinforcing member (20), any combination of two kinds of large-width strip-like expanded graphite, small-width strip-like expanded graphite, and equal-width strip-like expanded graphite can be used.

Figure 18:
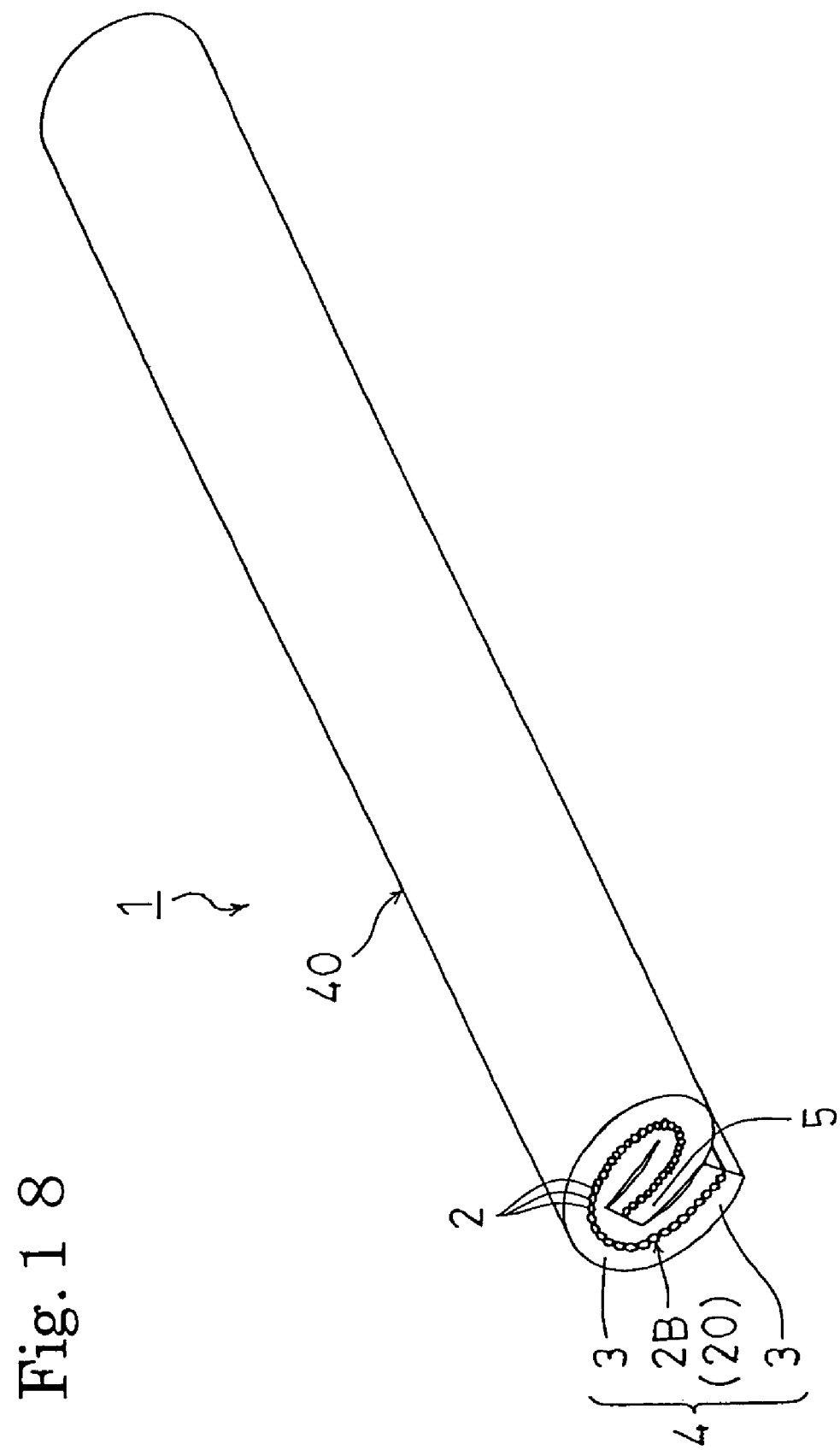

FIG. 18 is a perspective view showing a fourth embodiment of the gland packing material of the invention. The gland packing material (1) of the fourth embodiment is configured by the cord-like member (40) which is formed by winding the base member (4) that is configured in the same manner as the third embodiment described above, about the longitudinal direction. The carbon fibers (2) are placed in parallel with the longitudinal direction of the cord-like member (40). The other configuration is similar to that of the third embodiment, and functions in a similar manner. Therefore, its description is omitted.

In the embodiments described above, carbon fibers are used as the fibrous material. In the invention, alternatively, other brittle fibers, and tough fibers may be used. Examples of such brittle fibers are glass fibers such as E-glass, T-glass, C-glass, and S-glass, silica fibers, and ceramic fibers such as alumina and alumina-silica. Examples of the tough fibers are metal fibers such as stainless steel, aramid fibers, and PBO fibers.

Although a fiber-opened sheet is used as the sheet configured by a fibrous material, the fibrous material which is useful in the invention may be formed into a sheet-like shape by other means.

Next, the gland packing of the invention which is produced with using the gland packing material will be described.

Figure 19:
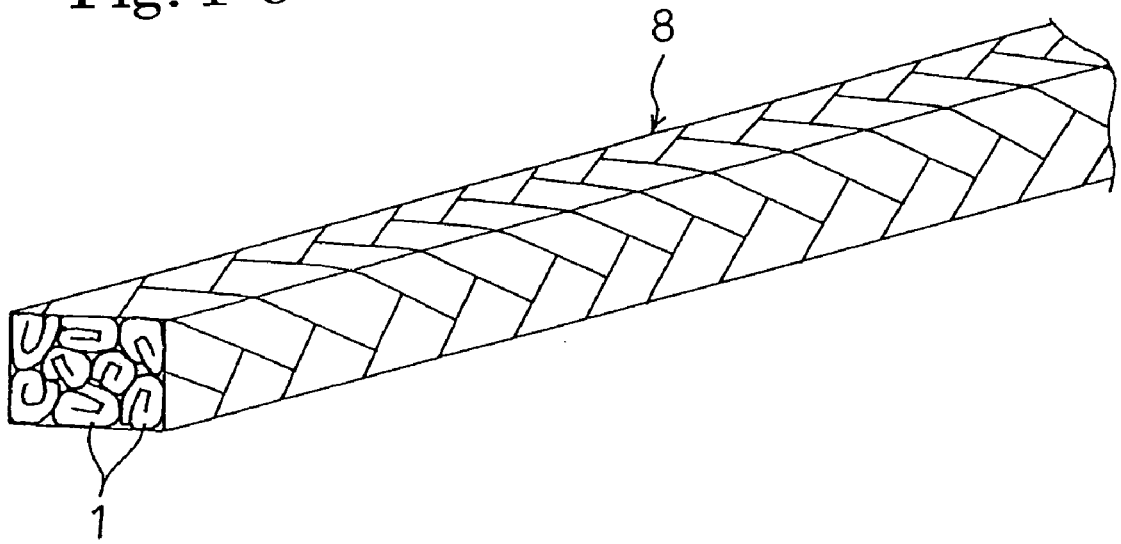

FIG. 19 is a perspective view showing an embodiment of the gland packing of the invention.

The cord-like gland packing (8) is produced by preparing a plurality of the above-described gland packing materials (1) of the invention, and bundling and braiding these gland packing materials (1) by a braiding machine. For example, the gland packing (8) shown in FIG. 20 is produced by conducting an eight-strand square-knitting process on eight gland packing materials (1).

The cord-like gland packing (8) is produced with using a plurality of the above-described gland packing materials (1) which have a high sealing property and an excellent shape-retaining property, whereby the expanded graphite is prevented from dropping off during the braiding process. As a result, in the gland packing (8), the elasticity is not reduced, the properties which are preferable in sealing, such as the compressibility and the recovery property are held, and the sealing property is improved. In the case where the packing is compressed or a pressure is applied to the packing, movement of expanded graphite particles is suppressed. Therefore, the sealing face pressure is prevented from being lowered, so that the pressure resistance performance is improved, and the pressure contact force to be applied to the counter member is kept to a high level, so that the sealing property is improved. As a result, the gland packing (8) can satisfactorily seal a shaft seal part of a fluid apparatus or the like.

In the gland packing material (1), moreover, the used amount of the adhesive agent is zero or a very small amount. Even when the gland packing (8) is used under a high temperature condition, therefore, reduction of the sealing property due to burning of the adhesive agent can be suppressed. Also because of this, the gland packing has an excellent sealing property.

Figure 20:
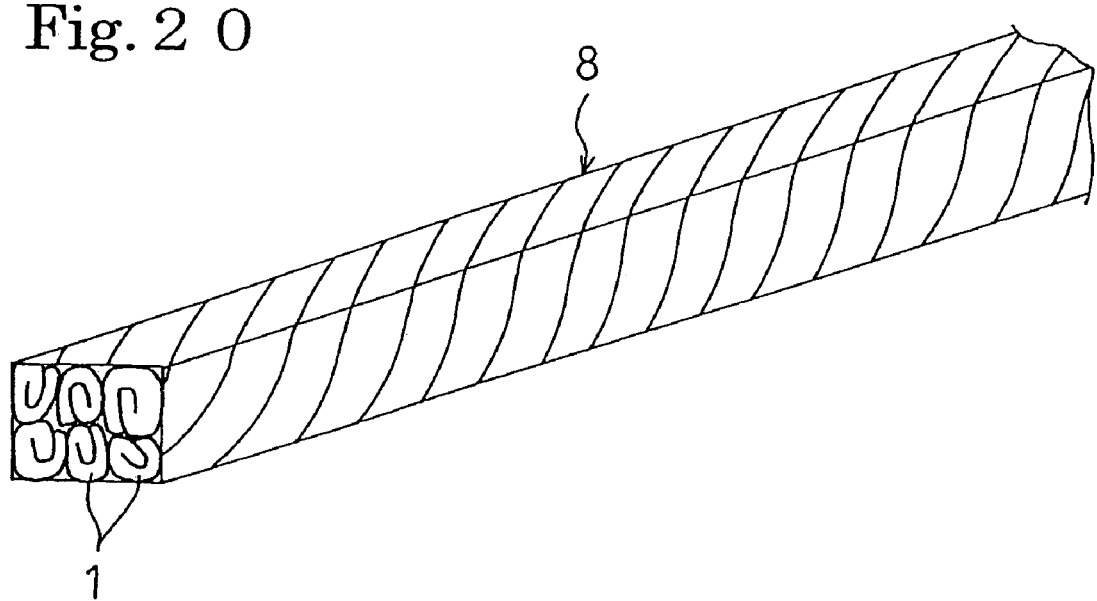
Figure 21:
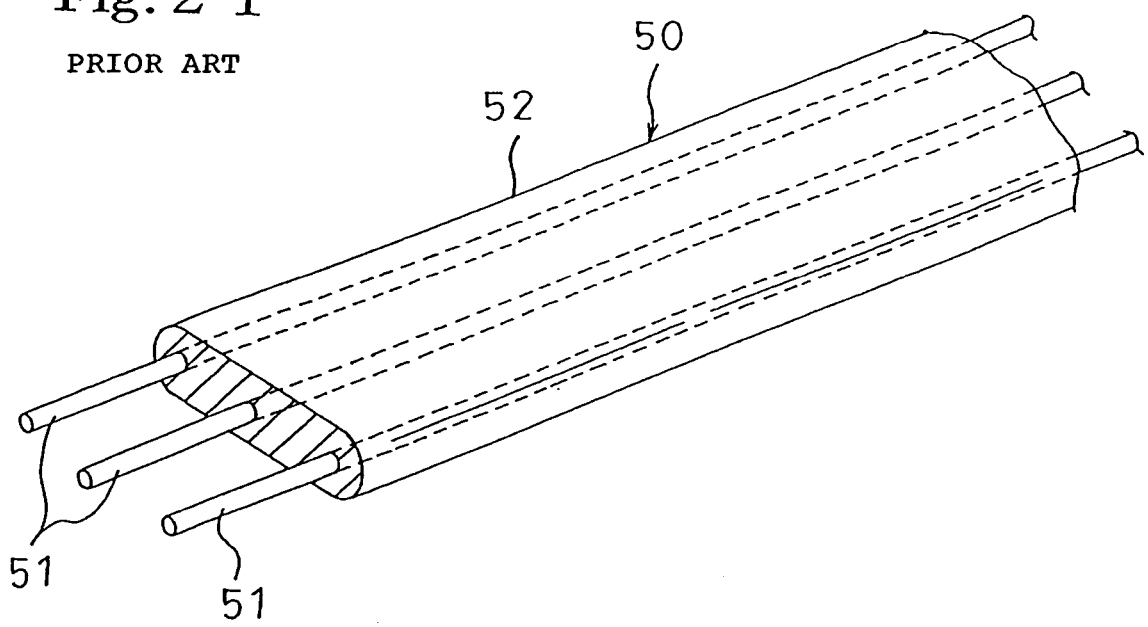
FIGS. 21 to 23 show the conventional art.
Figure 22:
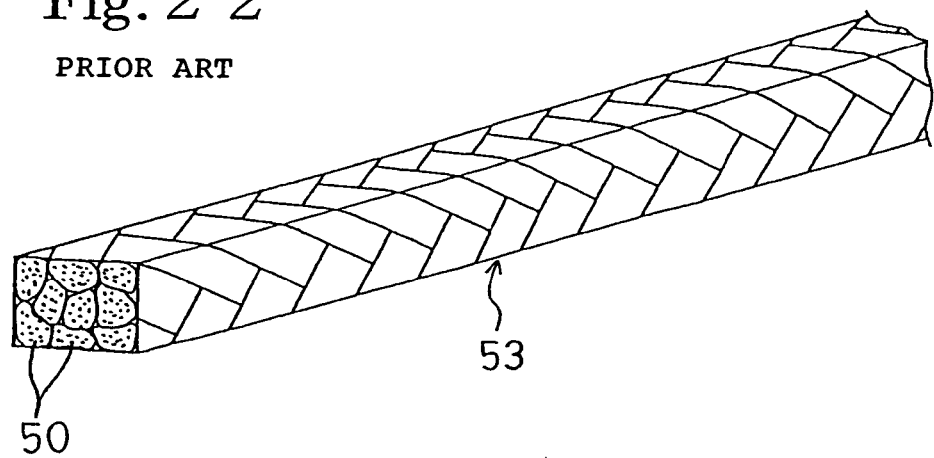
Figure 23:
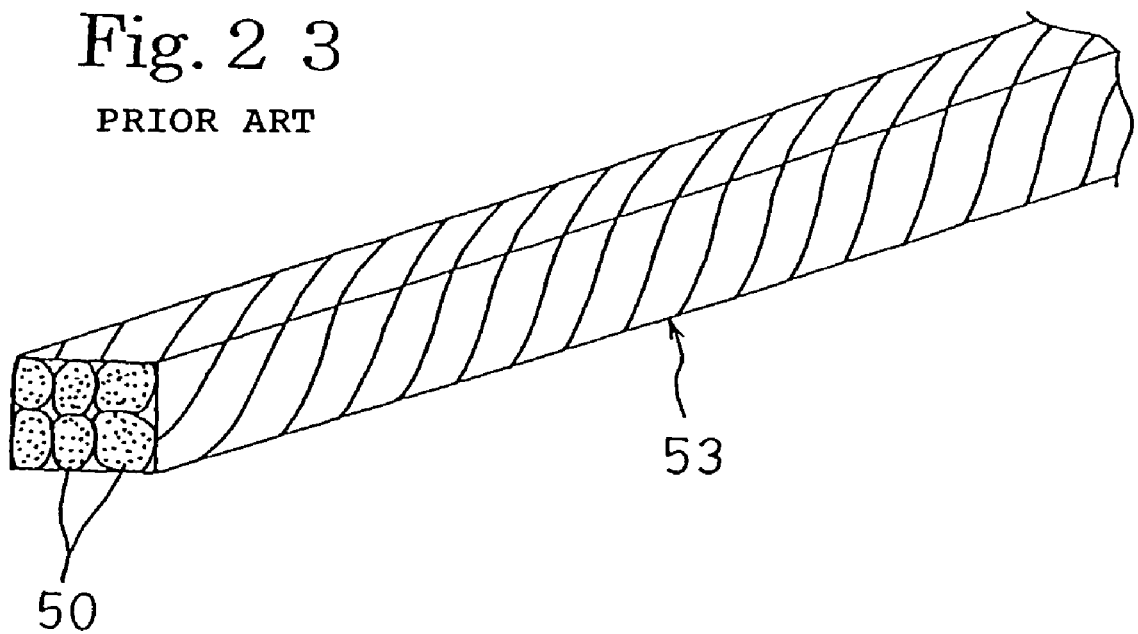

FIG. 20 is a perspective view showing another embodiment of the gland packing of the invention.

In the embodiment, the cord-like gland packing (8) is produced by, in place of braiding gland packing materials (1), bundling and twisting a plurality of gland packing materials (1). For example, the gland packing (8) shown in FIG. 20 is formed by conducting a roll molding process while bundling and applying a twisting process on six gland packing materials (1).

The gland packing (8) of the embodiment functions and attains effects in a similar manner as the embodiment in which the gland packing materials (1) are braided. Therefore, its description is omitted.

The invention claimed is:

1. A gland packing material wherein said gland packing material is configured by a cord-like member (40) which is formed by stranding a strip-like base member (4), or winding a strip-like base member (4) about a longitudinal direction, or winding a strip-like base member (4) about a longitudinal direction and then stranding said base member,
    said base member (4) comprises: a sheet-like reinforcing member (20) configured by a fibrous material (2); and a strip-like expanded graphite (3),
    said strip-like expanded graphite (3) is disposed at least on one face of said reinforcing member (20), a portion of said strip-like expanded graphite (3) is placed outside said cord-like member (40),
    said reinforcing member (20) is involved in said cordlike member (40),
    a large number of openings (20A) are formed in said reinforcing member (20), and said strip-like expanded graphite (3) faces said openings (20A).

2. A gland packing material according to claim 1, wherein a whole outside of said cord-like member (40) is covered by said strip-like expanded graphite (3).

3. A gland packing material according to claim 1, wherein said strip-like expanded graphite (3) is disposed only on one face of said reinforcing member (20).

4. A gland packing material according to claim 1, wherein said strip-like expanded graphite (3) is disposed on both faces of said reinforcing member (20).

5. A gland packing material according to claim 1, wherein said fibrous material (2) is configured by a fiber-opened sheet (2B) in which multifilament yarns are opened in a sheet-like shape.

6. A gland packing material according to claim 5, wherein a thickness of said fiber-opened sheet (2B) is set to 10 μm to 300 μm.

7. A gland packing material according to claim 1, wherein said fibrous material (2) is configured by one or two or more selected from the group consisting of carbon fibers and other brittle fibers, and tough fibers.

8. A gland packing material according to claim 7, wherein said brittle fibers are configured by one or two or more selected from the group consisting of glass fibers, silica fibers, and ceramic fibers.

9. A gland packing material according to claim 7, wherein said tough fibers are configured by one or two or more selected from the group consisting of metal fibers, aramid fibers, and PBO fibers.

10. A gland packing wherein a plurality of gland packing materials (1) according to any one of claims 1 to 9 are used, and braided or twisted.

* * * * *